Patented Mar. 17, 1925.

1,529,927

UNITED STATES PATENT OFFICE.

AUGUST HEINRICH SCHOBEL, OF BASEL, SWITZERLAND, ASSIGNOR TO SOCIETY OF CHEMICAL INDUSTRY IN BASLE, OF BASEL, SWITZERLAND.

AZO DYESTUFFS AND PROCESS OF MAKING SAME.

No Drawing. Application filed May 10, 1924. Serial No. 712,450.

*To all whom it may concern:*

Be it known that I, AUGUST HEINRICH SCHOBEL, a citizen of the Swiss Confederation, and residing at Basel, Switzerland, have invented new and useful Improvements in Azo Dyestuffs and Processes of Making Same, of which the following is a full, clear, and exact specification.

This invention relates to new dyestuffs which are particularly valuable for producing fast colours in chrome printing.

In specification of U. S. Patent No. 1,437,758 there are described violet to brown dyestuffs for chrome printing which are obtained by coupling resorcylic acid with diazo-compounds derived from 1-amino-2-hydroxynaphthalene-4-sulphonic acid. The present invention relates to an improvement in or modification of that described in U. S. Patent No. 1, 437,758.

According to the present invention dyestuffs which are particularly valuable for chrome printing are obtained by coupling resorcylic acid with one or two molecular proportions of the same or different diazo-compounds, one at least of which is an ortho-hydroxy-diazo-compound of the benzene series.

The dyestuffs are dark powders soluble in water to yellow-brown to brown-red solutions. In concentrated sulphuric acid they dissolve to yellow-brown to red-brown and blue solutions. In chrome printing on cotton they produce brown tints of very different shades and remarkably fast.

The following examples illustrate the invention without, however, limiting the same, the parts being by weight:—

Example 1.

The diazo-compound from 15.4 parts of 4-nitro-2-amino-1-hydroxybenzene, is introduced, while stirring, at a low temperature into a suspension of 15.4 parts of resorcylic acid, 5.3 parts of calcined sodium carbonate and 15 parts of magnesia. When coupling is complete the dyestuff is precipitated by means of mineral acid, filtered, dissolved in sodium carbonate solution and salted out.

The new dyestuff is a dark powder, soluble in water to a brown-red solution which becomes somewhat more red on addition of sodium carbonate. In concentrated sulphuric acid it dissolves to a yellow-brown solution. In chrome printing on cotton it produces full red-brown tints of very good fastness to washing and soaping and good fastness to chlorine and light.

Example 2.

The diazo-compound from 15.4 parts of 4-nitro-2-amino-1-hydroxybenzene is allowed to flow into a solution of 7.7 parts of resorcylic acid and 30 parts of calcined sodium carbonate. The dyestuff is then salted out.

It is a dark powder, soluble in water to a red-brown solution which becomes somewhat more red on addition of sodium carbonate. In concentrated sulphuric acid it dissolves to a red-brown solution. In chrome printing on cotton it yields violet-brown tints of good fastness.

Example 3.

The diazo-compound made in the usual manner from 22.3 parts of 1-hydroxy-2-amino-4-chlorobenzene-5-sulphonic acid is allowed to flow into a solution of 15.4 parts of resorcylic acid and 30 parts of calcined sodium carbonate. The dyestuff is precipitated by neutralizing by means of mineral acid.

It dissolves in water with a yellow brown solution which becomes blue-red on addition of sodium carbonate. In concentrated sulphuric acid it dissolves to a red solution. When chrome printed on cotton it produces violet-brown tints of very good fastness.

Example 4.

The diazo-compound from 22.3 parts of 1-hydroxy-2-amino-4-chlorobenzene-5-sulphonic acid is allowed to flow into a concentrated solution of 7.7 parts of resorcylic acid. After stirring for some hours at 15–20° C. coupling is complete, whereupon the dyestuff is precipitated by neutralizing the liquid with mineral acid. It dissolves in water to a brown-yellow solution which becomes red on addition of sodium carbonate. Concentrated sulphuric acid dissolves it to a blue-red solution. In chrome printing it produces on cotton violet tints of very good fastness.

Example 5.

19.8 parts of 1-hydroxy-2-amino-4-nitrobenzene-6-carboxylic acid are diazotized in the usual manner with 15 parts of hydrochloric acid and 6.9 parts of sodium nitrite. The diazo-compound is stirred into a solution of 15.4 parts of resorcylic acid and 30 parts of calcined sodium carbonate. Coupling occurs quickly. The dyestuff is salted out. It is a brown powder soluble in water to a yellow-brown solution, becoming red-brown on addition of sodium carbonate. In concentrated sulphuric acid it dissolves to an orange-red solution. In chrome printing on cotton it yields yellow-brown tints of good fastness.

Example 6.

The diazo-compound prepared in the usual manner from 19.8 parts of 1-hydroxy-2-amino-4-nitrobenzene-6-carboxylic acid, 15 parts of hydrochloric acid and 6.9 parts of sodium nitrite, is run into a concentrated solution of 7.7 parts of resorcylic acid. After stirring for some hours the diazo-compound has disappeared. The dyestuff is precipitated by saturating the solution with common salt.

The new dyestuff dissolves in water to a yellow-brown solution becoming a red-brown on addition of caustic soda lye. In concentrated sulphuric acid it dissolves to a brown-red solution. When printed with chromium acetate on cotton there is produced a brownish-yellow of good fastness.

Example 7.

Into an ice-cold solution of 15.4 parts of resorcylic acid and 30 parts of calcined sodium carbonate is run the diazo-compound from 22.3 parts of 1-hydroxy-2-amino-4-chlorobenzene-5-sulphonic acid, 6.9 parts of sodium nitrite and 15 parts of hydrochloric acid. When coupling is complete a further 10 parts of calcined sodium carbonate are added and there is stirred into the mixture at ordinary temperature the diazo-compound from 19.9 parts of 1-hydroxy-2-amino-4:6-dinitrobenzene and 6.9 parts of sodium nitrite. After stirring for some hours the coupling is complete and the dyestuff is precipitated from a boiling hot solution by adding common salt. The dyestuff is filtered, pressed and dried.

It dissolves in water to a brown solution becoming brown-red on addition of caustic alkali. In concentrated sulphuric acid it dissolves to a brown-red solution. When chrome printed on cotton it gives a beautiful violet-brown of very good fastness to washing, soaping and chlorine.

Example 8.

The diazo-compound from 19.8 parts of 1-hydroxy-2-amino-4-nitrobenzene-6-carboxylic acid is coupled with 15.4 parts of resorcylic acid in presence of 30 parts of calcined sodium carbonate. When the coupling is complete a further 10 parts of calcined sodium carbonate are added and there is allowed to flow in the diazo-compound prepared in the usual manner from 17.3 parts of 1-aminobenzene-3-sulphonic acid and 6.9 parts of sodium nitrite. After stirring for some hours coupling is complete and the dyestuff is then separated as usual.

The dyestuff dissolves in water to a yellow-brown solution which becomes red-brown on addition of caustic alkali. In concentrated sulphuric acid it dissolves to a brown-red solution. When printed on cotton with chromium acetate it yields a yellow-brown of good fastness.

Example 9.

The diazo-compound obtained from 23.3 parts of 1-hydroxy-2-amino-4-sulphobenzene-6-carboxylic acid, 6.9 parts of sodium nitrite and 15 parts of hydrochloric acid is allowed to flow into an ice-cold solution of 15.4 parts of resorcylic acid and 40 parts of calcined sodium carbonate. When the formation of the dyestuff is complete, coupling is repeated with the diazo-compound from 14.3 parts of α-napthylamine. After stirring in the cold for some hours the coupling is complete and the dyestuff may be isolated in the usual manner.

It dissolves in water to a yellow-brown solution which becomes redder on addition of caustic alkali. In concentrated sulphuric acid it dissolves to a blue solution. When chrome printed on cotton it yields a yellow-brown of good fastness.

What I claim is:—

1. The process for producing azo-dyestuffs which are particularly adapted for chrome printing by coupling one molecule of resorcylic acid with at the maximum two molecules of diazo-compounds, one at least of which being an ortho-hydroxy-diazo-compound of the benzene series.

2. The process for producing azo-dyestuffs which are particularly adapted for chrome printing by coupling one molecule of resorcylic acid with at the maximum two molecules of ortho-hydroxy-diazo-compounds of the benzene series.

3. The process for producing azo-dyestuffs which are particularly adapted for chrome printing by coupling one molecule of resorcylic acid with one molecule of an ortho-hydroxy-diazo-compound of the benzene series.

4. The process for producing azo-dyestuffs which are particularly adapted for chrome printing by coupling one molecule of resorcylic acid with one molecule of a non-sulphonated ortho-hydroxy-diazo-compound of the benzene series.

5. The process for producing azo-dyestuffs which are particularly adapted for chrome printing by coupling one molecule of resorcylic acid with one molecule of diazotized 4-nitro-2-amino-1-hydroxybenzene.

6. The herein described new dyestuffs which are obtained by coupling one molecule of resorcylic acid with at the maximum two molecules of diazo-compounds, one at least of which being an ortho-hydroxy-diazo-compound of the benzene series, which dyestuffs correspond to the general formula:

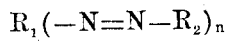

wherein $R_1$ stands for the residue of resorcylic acid, $R_2$ for an aromatic residue, n for a whole number smaller than 3, and in which at least one of the aromatic residues $R_2$ carries a hydroxy group which adheres in ortho-position to the azo-bridge, which dyestuffs form dark powders soluble in water to yellow-brown to brown-red solutions and dissolving in concentrated sulphuric acid to yellow-brown to red-brown solutions, producing, when chrome and blue printed on cotton, brown tints of very different shades and remarkably fast.

7. The herein described new dyestuffs which are obtained by coupling one molecule of resorcylic acid with at the maximum two molecules of ortho-hydroxy-diazo-compounds of the benzene series, which dyestuffs correspond to the general formula:

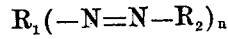

wherein $R_1$ stands for the residue of resorcylic acid, $R_2$ for an aromatic residue which carries a hydroxy group adhering in ortho-position to the azo-bridge, and n a whole number smaller than 3, which dyestuffs form dark powders soluble in water to yellow-brown to brown-red solutions and dissolving in concentrated sulphuric acid to yellow-brown to red-brown solutions, producing when chrome printed on cotton brown tints of very different shades and remarkably fast.

8. The herein described new dyestuffs which are obtained by coupling one molecule of resorcylic acid with one molecule of an ortho-hydroxy-diazo-compound of the benzene series, which dyestuffs correspond to the general formula:

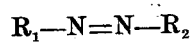

wherein $R_1$ stands for the residue of resorcylic acid and $R_2$ for an aromatic residue which carries a hydroxy group adhering in ortho-position to the azo-bridge, which dyestuffs form dark powders soluble in water to yellow-brown to brown-red solutions and dissolving in concentrated sulphuric acid to yellow-brown to red-brown solutions, producing when chrome printed on cotton brown tints of very different shades and remarkably fast.

9. The herein described new dyestuffs which are obtained by coupling one molecule of resorcylic acid with one molecule of a non-sulphonated ortho-hydroxy-diazo-compound of the benzene series, which dyestuffs correspond to the general formula:

wherein $R_1$ stands for the residue of resorcylic acid and $R_2$ for an unsulfonated aromatic residue which carries a hydroxy group adhering in ortho-position to the azo-bridge, which dyestuffs form dark powders soluble in water to yellow-brown to brown-red solutions and dissolving in concentrated sulphuric acid to yellow-brown to red-brown solutions, producing when chrome printed on cotton brown tints of very different shades and remarkably fast.

10. The herein described new dyestuff which is obtained by coupling one molecule of resorcylic acid with one molecule of diazotized 4-nitro-2-amino-1-hydroxybenzene corresponding to the general formula:

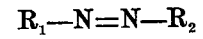

wherein $R_1$ stands for the residue of resorcylic acid and $R_2$ for a benzene nucleus which carries an OH group adhering in 2-position and an $NO_2$ group adhering in 5-position to the azo-bridge, which dyestuff forms a dark powder soluble in water to a brown-red solution and in concentrated sulphuric acid to a yellow-brown solution, and producing when chrome printed on cotton full red-brown tints of very different shades and remarkably fast.

In witness whereof I have hereunto signed my name this 28 day of April, 1924, in the presence of two subscribing witnesses.

AUGUST HEINRICH SCHOBEL.

Witnesses:
  MADELEINE SPENGLER,
  AMAND BRAUN.